(12) United States Patent
Hanks (10) Patent No.: US 10,293,283 B2
(45) Date of Patent: May 21, 2019

(54) MULTISTAGE FILTER

(71) Applicant: Gary D. Hanks, Bowling Green, KY (US)

(72) Inventor: Gary D. Hanks, Bowling Green, KY (US)

(*) Notice: Subject to any disclaimer, the term of this patent is extended or adjusted under 35 U.S.C. 154(b) by 0 days.

(21) Appl. No.: 14/120,988

(22) Filed: Jul. 18, 2014

(65) Prior Publication Data

US 2015/0122722 A1    May 7, 2015

Related U.S. Application Data

(63) Continuation-in-part of application No. 13/986,441, filed on May 2, 2013, now Pat. No. 9,480,936.

(60) Provisional application No. 61/958,040, filed on Jul. 18, 2013.

(51) Int. Cl.
| | |
|---|---|
| *B01D 29/58* | (2006.01) |
| *B01D 29/23* | (2006.01) |
| *B01D 29/05* | (2006.01) |
| *B01D 29/56* | (2006.01) |
| *B01D 27/14* | (2006.01) |
| *B01D 17/02* | (2006.01) |

(52) U.S. Cl.
CPC .......... B01D 29/58 (2013.01); B01D 17/0211 (2013.01); B01D 27/146 (2013.01); B01D 29/05 (2013.01); B01D 29/23 (2013.01); B01D 29/56 (2013.01)

(58) Field of Classification Search
CPC ...... B01D 27/146; B01D 29/05; B01D 29/56; B01D 29/004; B01D 29/0018; B01D 29/002; B01D 20/01; B01D 39/083; B01D 39/086; B01D 39/10; B01D 39/12; B01D 39/163; B01D 39/1692; B01D 39/2068; B01D 29/0004
USPC .................................................. 210/335, 489
See application file for complete search history.

(56) References Cited

U.S. PATENT DOCUMENTS

| | | | |
|---|---|---|---|
| 1,458,805 A | 6/1923 | Christensen | |
| 1,661,284 A | 3/1928 | Fugua et al. | |
| 2,630,227 A * | 3/1953 | Rodwell | B01D 27/00 210/265 |
| 2,846,073 A | 8/1958 | Hopper, Sr | |
| 3,331,510 A | 7/1967 | Arnold | |
| 3,754,656 A | 8/1973 | Horiguchi et al. | |
| 3,797,203 A | 3/1974 | Murdock, Sr. | |
| 3,849,311 A | 11/1974 | Jakubek | |
| 3,933,654 A | 1/1976 | Middelbeek | |
| 4,064,054 A | 12/1977 | Anderson et al. | |

(Continued)

*Primary Examiner* — Matthew O Savage
(74) *Attorney, Agent, or Firm* — Carrithers Law Office, PLLC (57) ABSTRACT

A filter for separating contaminants from fluids. The filter includes stages of differing materials arranged one after another wherein the first stage blocks and captures contaminants of a selected size and passes everything smaller than this selected size. The next stage captures contaminants of a selected size which is smaller than those blocked by the first stage. The subsequent stages capture smaller and smaller contaminants. The layers comprise various materials including stranded meshes, fibrous tissues, metallic screens and ceramic discs and tubes. Some of the ceramic discs and tubes include a downstream coating to capture further contaminants such as water droplets.

1 Claim, 8 Drawing Sheets

(56) References Cited

U.S. PATENT DOCUMENTS

| | | | |
|---|---|---|---|
| 4,115,277 A * | 9/1978 | Swank | A61M 1/3627 210/436 |
| 4,122,016 A | 10/1978 | Tao et al. | |
| 4,203,849 A | 5/1980 | Ino et al. | |
| 4,299,699 A | 11/1981 | Boogay | |
| 4,376,676 A | 3/1983 | Gill | |
| 4,400,274 A | 8/1983 | Protos | |
| 4,411,791 A | 10/1983 | Ward | |
| 4,568,901 A | 2/1986 | Adam | |
| 4,747,948 A | 5/1988 | North | |
| 5,085,773 A * | 2/1992 | Danowski | B01D 29/03 123/538 |
| 5,114,584 A * | 5/1992 | Sheckler | B01J 20/183 210/490 |
| 5,161,512 A | 11/1992 | Adam et al. | |
| 5,173,195 A | 12/1992 | Wright et al. | |
| 5,252,229 A | 10/1993 | Rojey et al. | |
| 5,314,617 A | 5/1994 | Karterman | |
| 5,397,472 A | 3/1995 | Bouchard | |
| 5,433,771 A * | 7/1995 | Bachovchin | B01D 39/12 55/282.2 |
| 5,520,825 A | 5/1996 | Rice | |
| 5,554,301 A | 9/1996 | Rippetoe et al. | |
| 5,628,901 A | 5/1997 | Lawrence et al. | |
| 5,685,974 A | 11/1997 | Fleming | |
| 5,698,102 A | 12/1997 | Khudenko | |
| 5,840,198 A | 11/1998 | Clarke | |
| 5,935,436 A * | 8/1999 | Lee | A61M 1/3633 210/252 |
| 6,042,722 A | 3/2000 | Lenz | |
| 6,056,128 A | 5/2000 | Glasgow | |
| 6,217,777 B1 | 4/2001 | Dahlquist et al. | |
| 6,315,131 B1 | 11/2001 | Terrien et al. | |
| 6,495,035 B2 | 12/2002 | Lingelem | |
| 2002/0074282 A1* | 6/2002 | Herrmann | B01D 39/12 210/490 |
| 2006/0151376 A1* | 7/2006 | Tubbs | B01D 35/02 210/335 |
| 2007/0090045 A1* | 4/2007 | Bakula | B01D 39/083 210/499 |
| 2016/0024895 A1* | 1/2016 | Russell | E21B 43/084 166/230 |

\* cited by examiner

MULTISTAGE FILTER

CROSS REFERENCES TO RELATED APPLICATIONS

This application claims priority from U.S. Provisional Patent Application No. 61/958,040 filed on Jul. 18, 2013 and is a Continuation in Part of U.S. application Ser. No. 13/985,441 filed on May 2, 2013, both of which are incorporated by reference herein in their entirety.

TECHNICAL FIELD

The present invention relates to the field of filters used to eliminate contaminants from liquids.

BACKGROUND OF THE INVENTION

Systems which involve liquid flow are frequently are plagued with blockages and restrictions caused by foreign contaminants. Because liquid systems cannot remain contaminant free, a liquid filtering system is always required. Contaminants within a fluid/liquid system exist due to many factors. The simple process of assembling and handling the fluid system parts and components often introduces undesirable contaminants. The act of turning a threaded pipe or fitting into a mating component often shears off thread burrs, allowing the burrs to flow through the liquid system. Small pieces of weld slag, grains from the foundry or cast core sand may be involved. Foreign matter may be deposited during storage of replacement piping and then released during assembly. Component wear and tear will introduce contaminants into the system. Contaminants may be introduced along with the desired fluids when fluid is added to the system. For these and many more reasons, a liquid system requires that a filtering system be in place and maintained.

The ideal liquid filtering system will remove all foreign contaminants from the liquid without impeding fluid flow through the system as demanded by the pump. Other desirable characteristics include: low cost, high capacity, small size and easy maintainability. There are three main types of filtration systems: mechanical, adsorbent, and absorbent. Typical liquid processing systems include some combination of these three types of filter.

Mechanical filters are probably the most common in industrial liquid systems. The liquid is forced by pressure through the filter element. The filter is composed of micro-openings, pores or tortuous passages that block and capture larger sizes particles. This type of filter, commonly referred to as a surface type filter, is normally composed of woven fabric, metallic or synthetic screens and/or absorbent paper or paper like materials. The constituent parts of such filters must be compatible with the process liquid and with the expected contaminants. Fire resistance (as applicable), resistance to collapse (due to pressure differential), and compatibility with system temperature are other important issues to consider in choosing a filter. Filters may be constructed of pleated stainless steel, Monel wire and synthetic woven materials.

Adsorbent filters are typically include porous materials such as cotton, paper, wood, cloth, asbestos, etc. Adsorption is a process wherein contaminants adhere to the surface or surfaces of a filter member rather that being trapped within a filter member. In general this type filter is used to filter fine soluble's and may be designed to allow selected dirty liquid through relatively thick layers with an increase in compactness of the filter material in the direction of flow.

Absorbent filters function by absorbing and trapping contaminants within a filter member. Examples of absorbent filter material include fuller's earth, boneback, ceramic, graphite, grapheme, charcoal, activated carbon, activated clay, copper, silver, platinum, gold, or other metals or metal compounds, chelating agents, or chemically treated organic mediums applicable to the filtration of oil, fuel, syngas, natural gas or other petroleum or alcohol based products. This type of liquid filtering system may be in the form of gravity feed bed or even a cartridge type installation. This system presents a large surface area through which the liquid flows. The insoluble oxidation products and solid contaminants are removed by size filtration and absorption.

SUMMARY OF THE INVENTION

In accordance with the present invention, there is provided a multistage filter capable of filtering contaminants from a liquid flowing under pressure into said multistage filter, said multistage filter comprising, consisting of, or consisting essentially of an outer cylindrical shell having a first end sealed, a second end containing a central outlet port and at least one inlet port near a peripheral edge thereof. The cylindrical shell contains at least two concentric cylindrical filter media. The ends of the two cylindrically shaped media are fluidly sealed against the inner surfaces of the first sealed end and the second end of the cylindrical shell. The at least one inlet port is in fluid communication with the outer surface of the first outer cylindrical stage. The central outlet port is in fluid communication with the inner surface of the innermost one of the at least two concentric cylindrically shaped filter media. The innermost one of said at least two concentric cylindrically shaped filter media comprising ceramic and including a filter coating on an inner surface thereof.

The present invention provides a multistage filter capable of filtering contaminants from a liquid flowing under pressure into the multistage filter. The filter comprises an imperforate outer cylindrical shell having an inner surface and a first stage layer formed of plastic screen having a flat disc shape with apertures there through for defining an inlet. A an outer peripheral edge of the first stage layer is sealed to the inner surface of the outer cylindrical shell and the first stage layer has a downstream surface. A second stage layer formed of a metallic screen has a flat disc shape with openings of a size ranging of from 76 to 100 microns, wherein an outer peripheral edge of the second stage layer is sealed to the inner surface of the outer cylindrical shell. The second stage layer has upstream and downstream surfaces, and the upstream surface of the second stage layer is in contact with the downstream surface of the first stage layer. A third stage layer of material has a flat disc shape with openings that are 60 microns in size with an outer peripheral edge of the third stage layer sealed to the inner surface of the outer cylindrical shell. The third stage layer has upstream and downstream surfaces, and the upstream surface of the third stage layer is in contact with the downstream surface of the second stage layer. A fourth stage layer of material has a flat disc shape with openings that are 30 microns in size and an outer peripheral edge of the fourth stage layer is sealed to the inner surface of the outer cylindrical shell. The fourth stage layer has upstream and downstream surfaces, and the upstream surface of the fourth stage layer is in contact with the downstream surface of the third stage layer. A fifth stage layer of ceramic material has a flat disc shape with openings that are 10 microns in size and an outer peripheral edge of the fifth stage layer is sealed to the inner surface of the outer cylindrical shell. The fifth stage layer has upstream and downstream surfaces and the upstream surface of the fifth stage layer is in contact with the downstream surface of the fourth stage layer. An o-ring has upper and lower surfaces with the upper surface of the o-ring in sealing contact with the downstream surface of the fifth stage layer. A sixth stage layer comprises a metallic screen having an outer peripheral edge sealed to the inner surface of the outer cylindrical shell. The sixth stage layer has upstream and downstream surfaces with the upstream surface of the sixth stage layer in sealing contact with the lower surface of the o-ring. A bottom cover includes an output aperture, wherein an outer peripheral surface of the bottom cover is sealed to the inner surface of the outer cylindrical shell, and wherein an upper surface of the bottom cover is in contact with the downstream surface of the sixth stage layer.

It is an object of this invention to provide a multistage canister filter which includes a plurality of stages or layers of filtering material of differing porosities.

It is an object of this invention to provide a multistage canister filter wherein all of the incoming liquid is forced through the first and then subsequent stages so that no amount of the incoming liquid is allowed to bypass any one stage of the multistage filter.

It is an object of this invention to provide a multistage canister filter wherein the first stage blocks contaminants of the largest size and allows the liquid and the smaller contaminants to pass to the next stage, the next stage traps the next largest size contaminants and so on and so on until the liquid is acceptably free of all undesirable contaminants.

It is an object of this invention to provide a multistage canister filter wherein all of the filter stages include one or more of the following elements: metallic or synthetic mesh type screen, stranded meshes, fibrous tissues, paper and/or paper-like materials, metallic screens, ceramic discs and ceramic tubes.

It is an object of this invention to provide a multistage canister filter wherein the final stage includes a cylindrical ceramic filter media where the inner surface of the ceramic includes a coating which further catches selected contaminants which are able to pass through the ceramic filter media.

It is an object of the present invention to provide filters or coatings on filters which function as chelating agents which chemically react with selected compounds.

It is another object of the present invention to provide filter material or filter coated material which adsorbs selected molecules of a particular compound due to ionic attraction or molecular size.

It is another object of the present invention to provide filter material which can adsorbed by activated charcoal or coat a charcoal or ceramic material which is reacts with and combines to hold selected chemical compounds.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 24 shows an enlarged view of a portion of FIG. 8.

FIG. 25 shows an enlarged view of a portion of FIG. 9.

FIG. 26 shows an enlarged view of a portion of FIG. 10.

DESCRIPTION OF THE PREFERRED EMBODIMENTS

Figure 3:
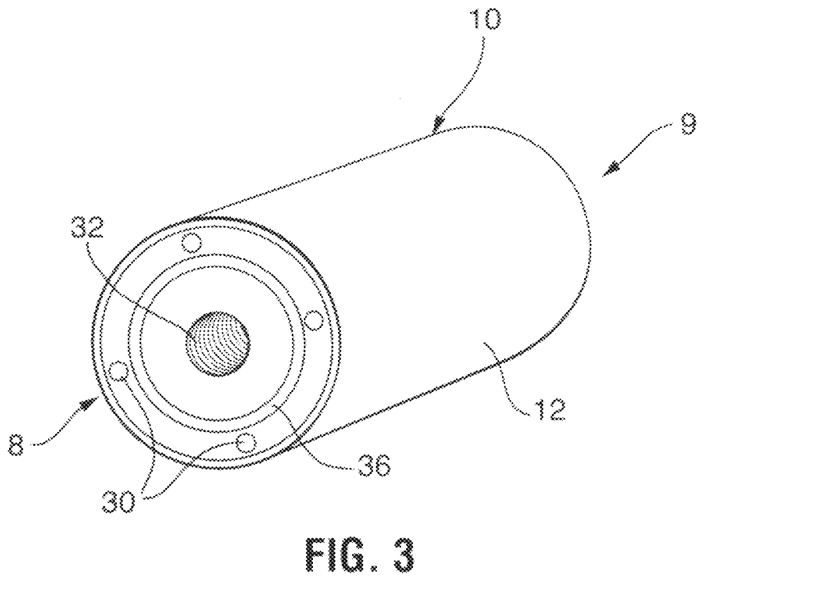
FIG. 3 is a perspective end view of the multistage canister filter.
Figure 4:
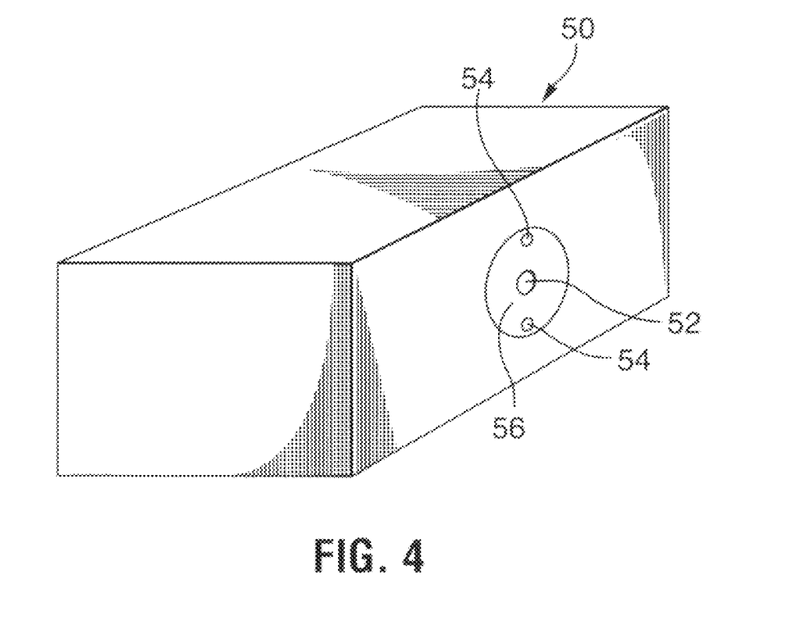
FIG. 4 is perspective view of a liquid handling system including a pump.

In accordance with the present invention, there is provided a multistage filter for removing contaminants from selected liquids such as fuels and oils. The multistage filter 10 shown in FIG. 3 is cylindrical with a sealed end 9 and a ported end 8 including multiple inlet ports 30 near the outer edges and one outlet port 32 in the center of ported end 8. The ported end 8 includes an outer O-ring or flat ring 34 and an inner O-ring or flat ring 36. The ported end 8 of the multistage filter 10 is held firmly against the flat mating surface 56 of a liquid handling unit 50 which includes a pump. The liquid handling unit 50 includes and at least one outlet port 54 and a central inlet port 52. The O-rings 34 and 36 are thus held tightly against the flat mating surface 56 and form a sealed connection between the filter 10 and the liquid handling unit 50. The filter 10 is situated against the mating surface so that the outlet port or ports 54 of the liquid handling unit 50 are fluidly connected between O-ring 34 and O-ring 36 and therefore, liquid pumped out of outlet ports 52 would be forced through the inlet ports 30 of filter 10. It follows then that the inlet port 52 of liquid handling unit 50 receives liquid from the outlet port 32 of filter 10.

Figure 1:
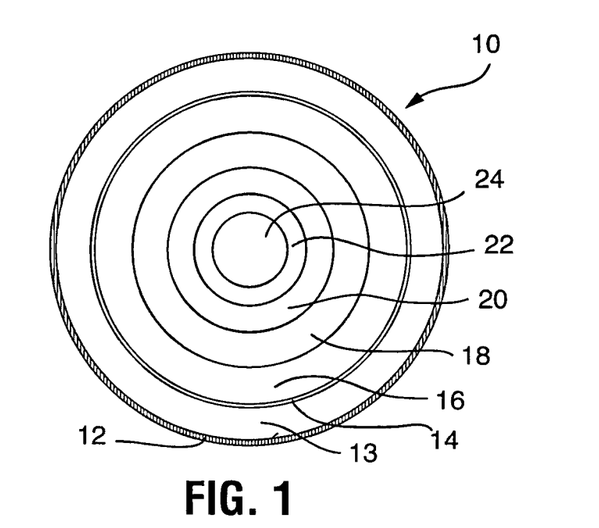
FIG. 1 is a cross-sectional view of a multistage canister filter showing the various filter elements.
Figure 2:
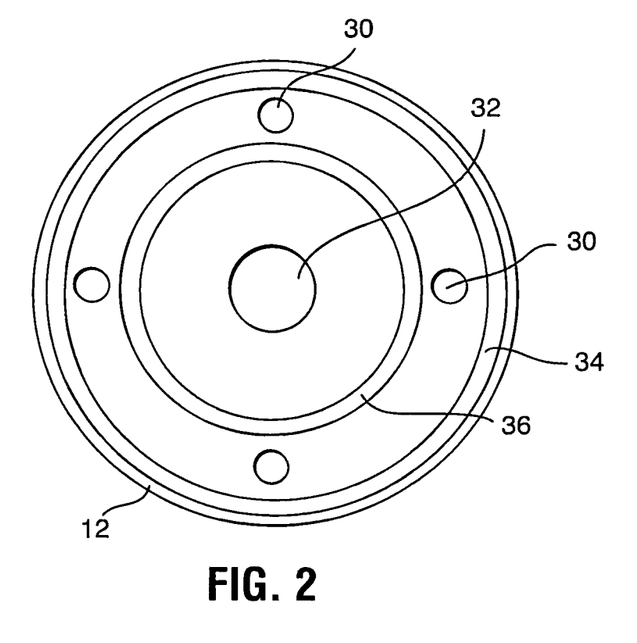
FIG. 2 is an end view of a multistage canister filter showing the central outlet port and the plurality of outer inlet ports.

FIG. 1 shows a cross-sectional view of filter 10 which includes several concentric cylindrical stages. The area 13 between the outer shell 12 and the first stage 14 of filter 10 is the area into which the inlet ports 30 feed liquid under pressure from the pump in liquid handling unit 50.

It is understood that the filter 10 is cylindrical and contains concentric cylindrical filter stages of various selected filtering capabilities. It is further understood that all of the concentric cylindrical stages are tightly held against or are firmly and sealingly connected to the ported end 8 and the sealed end 9 of the filter 10 so that no amount of fluid may leak past any one stage of the filter. The first stage includes a screen 14 which catches contaminants of a selected size and passes everything which is smaller. The second stage is a cylindrical filter material 16 which catches contaminants of a next smaller selected size and passes everything which is yet smaller. The third stage 18 is a second cylindrical filter material which will catch contaminants of a next smaller selected size which are small enough to get through the first stage 14 and the second stage 16 but will pass contaminants which are yet smaller in size. The fourth stage 20 is a third cylindrical filter material which will catch contaminants of yet a next smaller selected size which are small enough to get through the first stage 14, the second stage 16 and the third stage 18, but will pass contaminants which are yet smaller in size. The final stage 22 is a cylindrical ceramic finer sized to catch contaminants of yet a next smaller selected size which are small enough to get through the first stage 14, the second stage 16, the third stage 18, and the fourth stage 20, but will pass contaminants which are yet smaller in size.

It is therefore understood that filter 10 contains multiple stages of varying filtering capabilities and that the first stage catches large sized contaminants and each subsequent stage catches contaminants of a next smaller size. This configuration is the most efficient configuration of filter elements. If the order of the elements was reversed with the first element catching everything including the smallest sized contaminants, no contaminants would ever proceed to the next stages and more importantly, the first stage would become clogged quickly.

The following is a list of various filter materials with varying filtering capabilities described in terms of the size of particles which will be trapped by the material given in microns or millions of a meter:

LIST OF FILTER MEDIA

1 Envirostran poly flow material 40 to 60 micron used—beginning FST-26, 63, RF-6, 4, & 8
2 Envirostran poly flow material 15 to 25 micron used—middle RF-8
3 Envirostran poly flow material 5 to 10 micron used before ceramics FST-26, 63, RF-6, 4, & 8
4 Poly flow material 8 micron
5 Poly flow material 5 micron
6 Matt finish combination poly flow material with weave design 8 to 10 micron
7 Matt finish weave combination poly flow material with weave design 2 to 5 micron
8 SS, copper, aluminum, or iron pads used to remove particulate, sulfur, and other unwanted chemicals
9 SS wire cloth 30 micron single weave, or can be double dutch weave
10 SS wire cloth 10 micron single weave, or can be double dutch weave
11 Double weave, matt finish poly flow material 8 micron
12 Ceramics from 2 to 15 microns
13 Metallic screens 40 to 100 microns
14 Zeolite coating 1 micron (captures water)
15 Film membranes filtering to the molecular level Filtering coatings other than Zeolite include cationic coatings but do not include catalytic coatings. Film membranes are used as filter media. Ultrafiltration is a variety of membrane filtration in which hydrostatic pressure forces a liquid against a semipermeable membrane. Suspended solids and solutes of high molecular weight are retained, while water and low molecular weight solutes pass through the membrane. This separation process is used in industry and research for purifying and concentrating macromolecular ($10^3$-$10^6$ Daltons or unified atomic mass units) solutions, especially protein solutions. Ultrafiltration is not fundamentally different from microfiltration except in terms of the size of the molecules it retains. Microfiltration is a membrane technical filtration process which removes contaminants from a fluid (liquid & gas) by passage through a microporous membrane. A typical microfiltration membrane pore size range is 0.1 to 10 micrometers (μm). Microfiltration is fundamentally different from reverse osmosis and nanofiltration because those systems use pressure as a means of forcing water to go from low pressure to high pressure. Microfiltration can use a pressurized system but it does not need to include pressure.

Figure 8A:
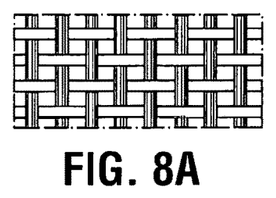
FIG. 8A is a top view of an example of "Dutch weave" woven material.
Figure 8B:
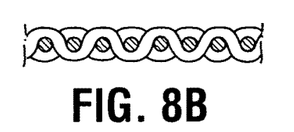
FIG. 8B shows an edge view of the "Dutch weave' woven material shown in FIG. 8A.
Figure 9A:
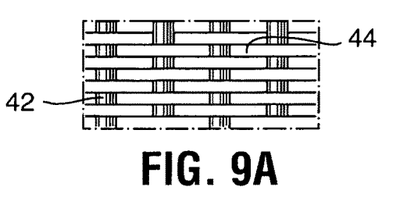
FIG. 9A is a top view of an example of 'Dutch weave' woven material.
Figure 9B:
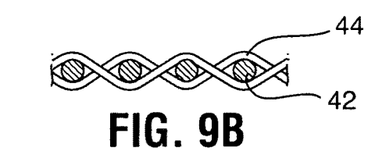
FIG. 9B shows an edge view of the "Dutch weave' woven material shown in FIG. 9A.
Figure 10A:
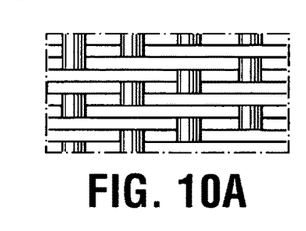
FIG. 10A is a top view of an example of 'Dutch weave' woven material.
Figure 10B:
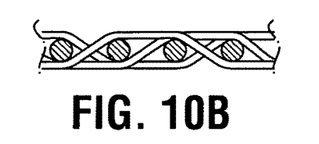
FIG. 10B shows an edge view of the "double Dutch weave' woven material shown in FIG. 10A.
Figure 11:
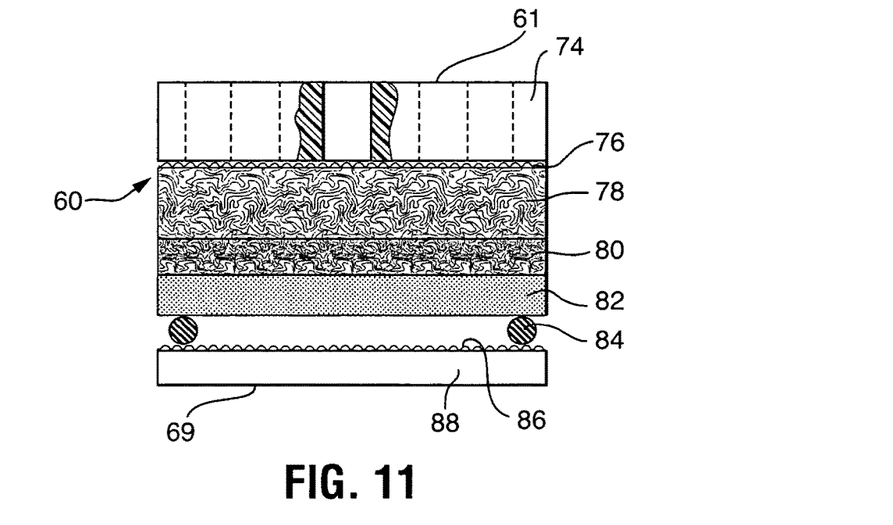
FIG. 11 is a cross-sectional view of another embodiment of the multistage filter.
Figure 12:
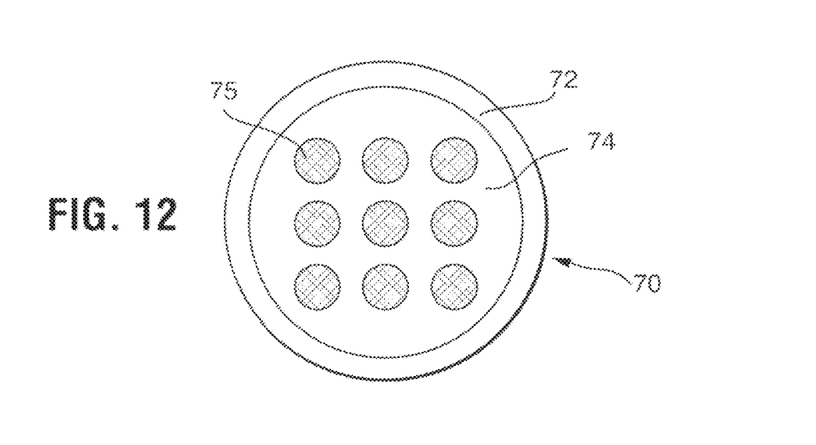
FIG. 12 is a top view of a linear multistage cylindrical filter.
Figure 13:
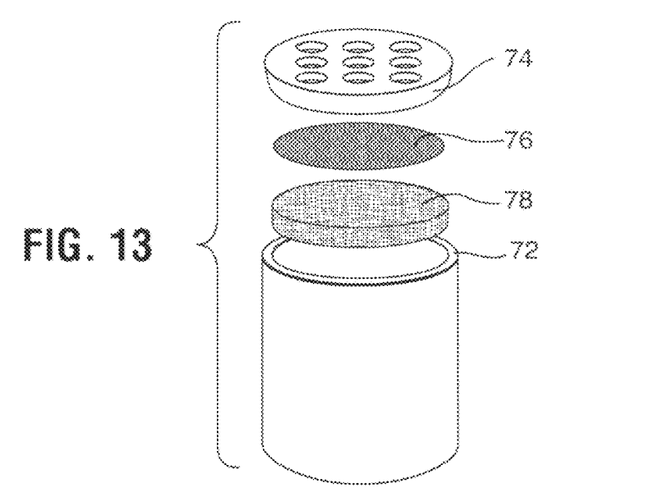
FIG. 13 is a top view of selected inner components linear multistage cylindrical filter.
Figure 14:
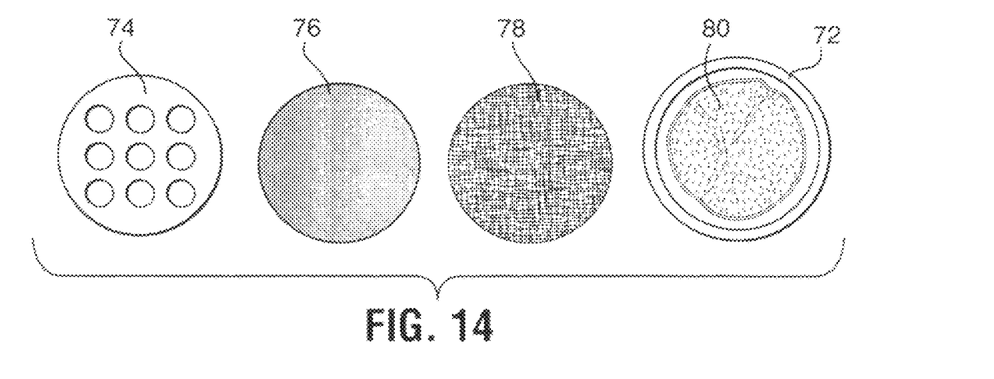
FIG. 14 is a top view of other selected inner components linear multistage cylindrical filter.
Figure 15:
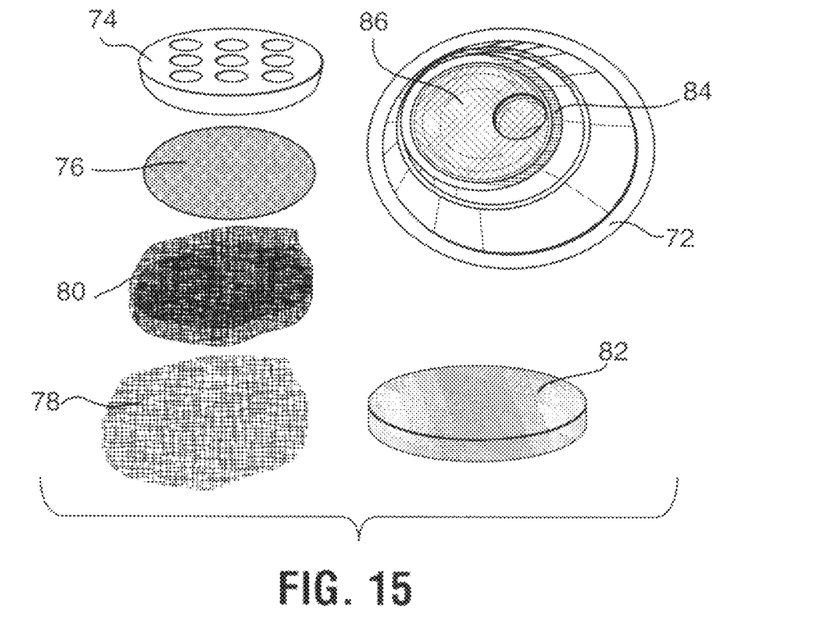
FIG. 15 is a top view of other selected inner components linear multistage cylindrical filter.
Figure 16:
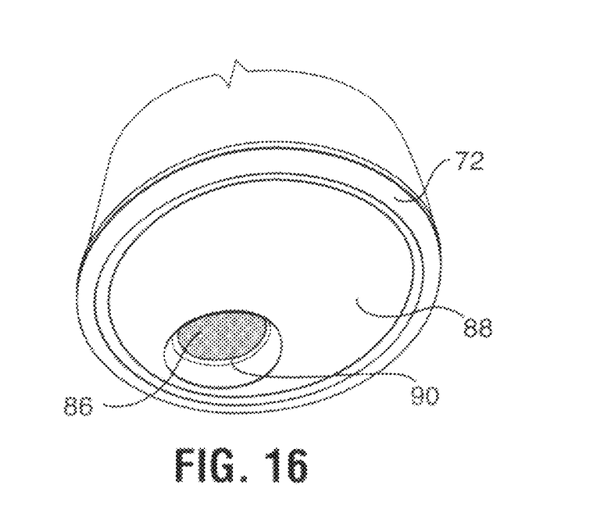
FIG. 16 is a bottom view of the linear multistage cylindrical filter.

Numbers 9 and 10 in the above list refer to a 'double dutch' weave. A dutch weave, shown in FIG. 9, is a wire mesh or filter cloth with warp wires larger than the weft wires. (Warp refers to the vertical wires 42 and weft refers to the horizontal wires 44 in the mesh as shown in FIG. 8 which is a plain weave.) As shown in FIG. 9, warp wires remain straight while adjacent weft wires slightly overlap, resulting in a dense, strong material with small irregular, twisting passages that appear triangular in shape when viewing the material diagonally. Double dutch weave, shown in FIG. 10, is a dutch weave where the weft wires alternately weave through alternate pairs of warp wires. Dutch weaves have much lower flow rates and much higher particle retention than plain square weaves.

Figure 6:
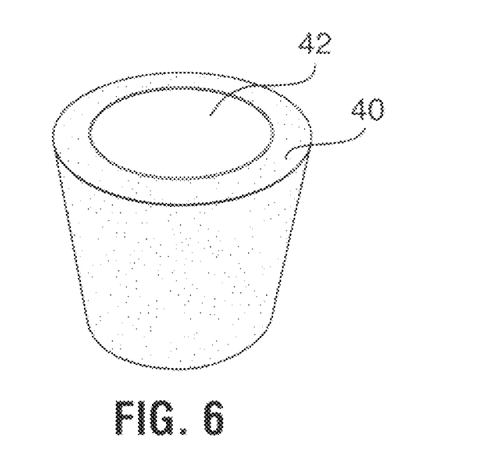
FIG. 6 is perspective view of a cylindrical ceramic filter medium with a Zeolite inner coating.
Figure 7:
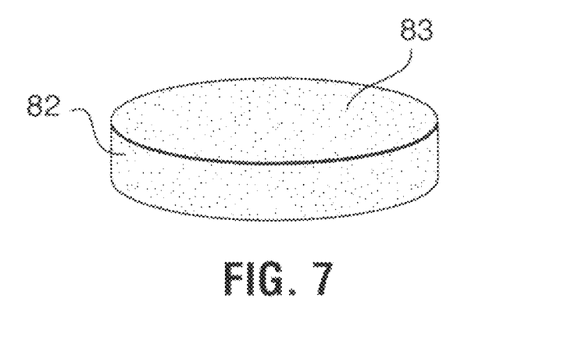
FIG. 7 is perspective view of a disc shaped ceramic filter medium with a Zeolite inner coating.

Preferred embodiments of the present invention include a final stage which is a ceramic element. Certain preferred embodiments include a ceramic filter 40, as shown in FIG. 6, which has an inner coating 42 of a material such as Zeolite, which filters even smaller contaminants than the ceramic medium 40. A Zeolite coating is capable of blocking contaminants, such as droplets of water, down to 1 micron in size. Zeolite in powder form (either man made or natural) it can be coated to the inside or outside of any of the filtration media. This is excellent for removing water droplets at the 1 micron level. One downside is the filter cartridge has to be vacuum sealed until it is installed due to the moisture in the air.

Preferred embodiments of the multistage filter of the present invention therefore include from two to ten filtering stages or more wherein the filtering stages are concentric cylindrical elements where the outer stages contain filter material which catch larger particles than the next inner stages. An example of such a preferred embodiment includes:
a first stage which is a metallic screen which passes 75 micron contaminants;
a second stage which is Envirostran poly flow material which passes 50 micron contaminants;
a third stage which is Envirostran poly flow material which passes 10 micron contaminants;
a fourth stage which is a matte finish weave combination poly flow material which passes 5 micron contaminants; and a ceramic element which passes 3 micron contaminants.

Another embodiment of the present invention is a linear filter 70, shown in FIGS. 11-16. The shell 72 of the filter body in the figures is cylindrical but may be cubic, rectangular, or ovoid. The stages of the filter 70 are stacked linearly, one above the other rather than concentric cylinders. The flow is in at the top 61 and out the bottom 69. The first stage is a plastic screen 74 with nine apertures 75. The second stage is a metallic screen 76 of 100 micron mesh. The third stage is a Envirostran poly flow material 78 with 60 micron filtering. The fourth stage is a Envirostran poly flow material 80 with 30 micron filtering. The fifth stage is a ceramic disc 82 with 10 micron filtering. An O-ring 84 of Buna N rubber separates the ceramic disc 82 from the sixth stage which is a metallic screen 86 and a bottom cover 88 including an output aperture 90.

Figure 17:
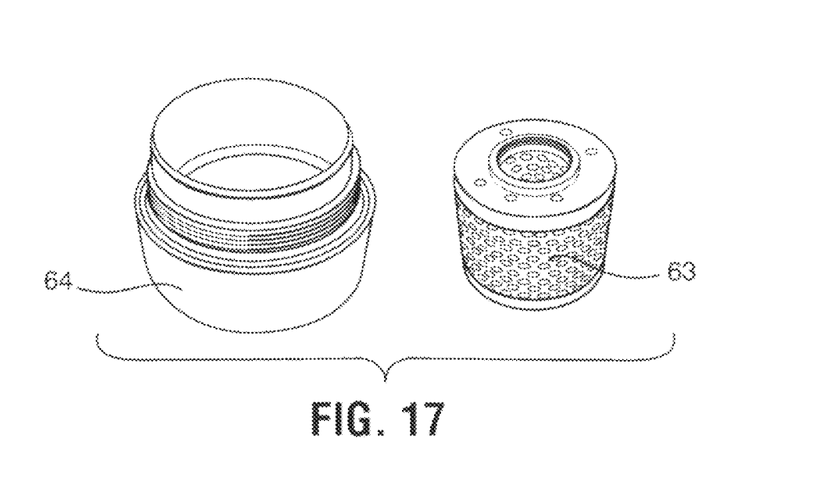
FIG. 17 is a front view of a screw on filter housing and a filter element.
Figure 18:
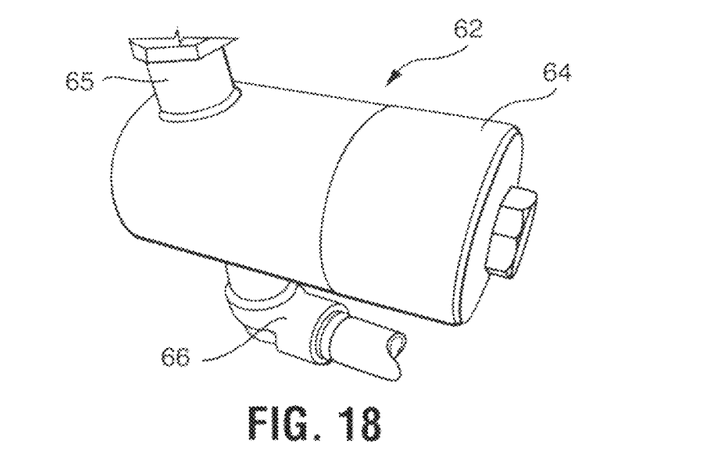
FIG. 18 is a front view of a filter housing installed.
Figure 19:
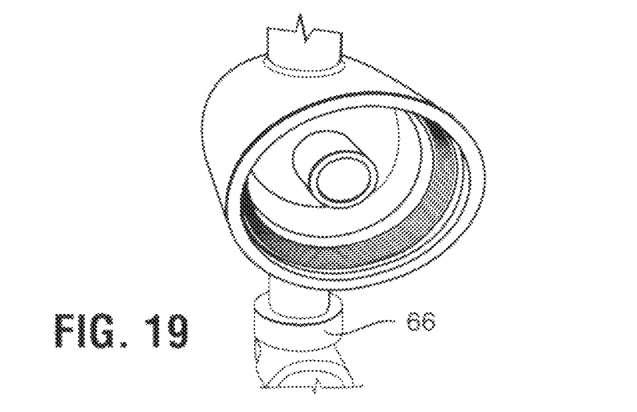
FIG. 19 is a front view of a base for receiving and holding a filter element and a screw on filter housing.

Typically filters of the present invention include a cylindrical housing with filter elements inside arranged in stages or layers and wherein the fluid or gas to be filtered enters through an input port and exits through an output port. The layers are arranged in order so that the larger sized contaminants are blocked in the first encountered layers and progressively smaller contaminants are filtered in subsequent layers as the fluid or gas moves toward the output port. Input and output ports are located either on the filter housing ends as in FIG. 20 or on the filter housing side as in FIGS. 18 and 19. For example, the filter housing 62 in FIGS. 17-19 includes a filter element 63, a screw-on lid 64, an input port 65 and an output port 66. Another example shown in FIG. 20 has input 112 on one end and output 114 at the opposite end of the housing 110.

Figure 5:
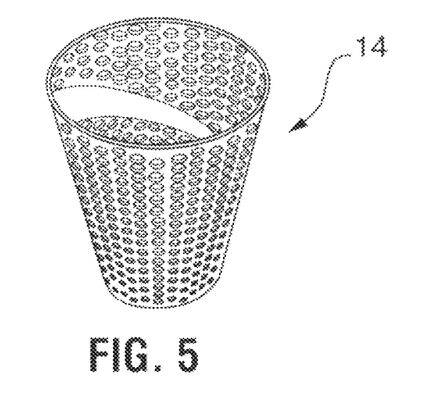
FIG. 5 is perspective view of a cylindrical screen filter medium.
Figures 20, 21, 22:
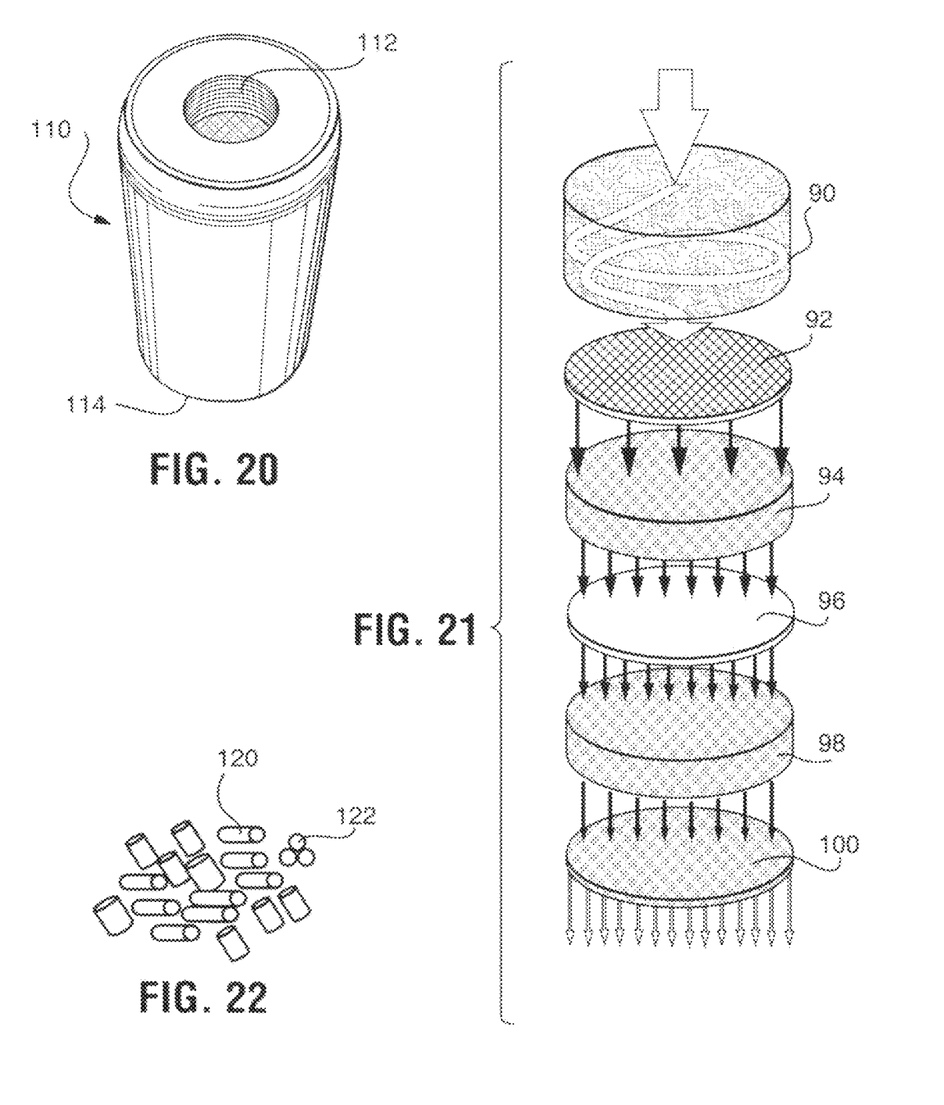
FIG. 20 is a cylindrical filter with an inlet port at one end and an outlet port at the other.
FIG. 21 is a group of disc shaped filter media portions aligned as if in a cylindrical housing.
FIG. 22 is a group of cylindrical, spherical, or disc shaped activated charcoal pellets coated with a selected oxide.

The layers or stages of filter elements are shaped and arranged in two different ways. The first arrangement has filter media layers which are cylindrical in shape as seen in FIGS. 1, 5, and 6 and are therefore arranged concentrically as shown if FIG. 1 so that the flow of fluid or gas is preferably from the outer cylindrical layer 12 through consecutive cylindrical layers 14-22 to the output port 32. The other preferred arrangement and shape of filter layers as shown in FIGS. 20 and 21 contains disc shaped filter layers 90-100, for example. The number of layers in either arrangement is only limited by the relative sizes and thicknesses of the layers and the size of the filter housing.

Filter 110 in FIG. 20 contains the layers 90-100 in FIG. 21 contain media selected from the list of filter media above or other media. Other examples of filter media are shown in FIGS. 22 and 23. Cylindrical or pill shaped pellets 120 or spherical pellets 122 include an activated charcoal substrate coated or impregnated with aluminum oxide or copper oxide. These pellets are from one to ten millimeters in length or smaller. Aluminum oxide or copper oxide coated pellets are ideal for trapping sulfur impurities in natural gas or LPG. One embodiment of the present invention is a filter 110 with disc shaped elements 90 through 100 wherein element 90 is filled with aluminum oxide coated pellets 120 or with copper oxide coated pellets 122.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:
1. A multistage filter capable of filtering contaminants from a liquid flowing under pressure into said multistage filter, said multistage filter comprising:
an imperforate outer cylindrical shell having an inner surface,
a first stage layer formed of plastic screen having a flat disc shape with apertures there through for defining an inlet, wherein an outer peripheral edge of the first stage layer is sealed to the inner surface of the outer cylindrical shell, and wherein the first stage layer has a downstream surface;
a second stage layer formed of metallic screen having a flat disc shape with openings of a size ranging of from 76 to 100 microns, wherein an outer peripheral edge of the second stage layer is sealed to the inner surface of the outer cylindrical shell, wherein the second stage layer has upstream and downstream surfaces, and wherein the upstream surface of the second stage layer is in contact with the downstream surface of the first stage layer;
a third stage layer of material having a flat disc shape with openings that are 60 microns in size, wherein an outer peripheral edge of the third stage layer is sealed to the inner surface of the outer cylindrical shell, wherein the third stage layer has upstream and downstream surfaces, and wherein the upstream surface of the third stage layer is in contact with the downstream surface of the second stage layer;
a fourth stage layer of material having a flat disc shape with openings that are 30 microns in size, wherein an outer peripheral edge of the fourth stage layer is sealed to the inner surface of the outer cylindrical shell, wherein the fourth stage layer has upstream and downstream surfaces, and wherein the upstream surface of the fourth stage layer is in contact with the downstream surface of the third stage layer;
a fifth stage layer of ceramic material having a flat disc shape with openings that are 10 microns in size, wherein an outer peripheral edge of the fifth stage layer is sealed to the inner surface of the outer cylindrical shell, wherein the fifth stage layer has upstream and downstream surfaces, and wherein the upstream surface of the fifth stage layer is in contact with the downstream surface of the fourth stage layer;
an 0-ring having upper and lower surfaces, wherein the upper surface of the 0-ring is in sealing contact with the downstream surface of the fifth stage layer;
a sixth stage layer of a metallic screen, wherein an outer peripheral edge of the sixth stage layer is sealed to the inner surface of the outer cylindrical shell, wherein the sixth stage layer has upstream and downstream sur- faces, and wherein the upstream surface of the sixth stage layer is in sealing contact with the lower surface of the 0-ring; and a bottom cover including an output aperture, wherein an outer peripheral surface of the bottom cover is sealed to the inner surface of the outer cylindrical shell, and wherein an upper surface of the bottom cover is in contact with the downstream surface of the sixth stage layer.

\* \* \* \* \*